United States Patent [19]
Bratton

[11] 3,774,816
[45] Nov. 27, 1973

[54] EXTRUSION PACKAGES FOR VISCOUS MATERIALS

[76] Inventor: Francis H. Bratton, c/o Aprand, Inc., F. H. Bratton, P.O. Box 345, Marion, Va. 24354

[22] Filed: July 12, 1971

[21] Appl. No.: 161,495

[52] U.S. Cl. ............................. 222/391, 222/145
[51] Int. Cl. ........................................ B67g 17/00
[58] Field of Search ................. 222/386, 326, 129, 222/145, 138, 391, 392, 390, 142, 327, 507, 222/95; 206/56 G, 56 R; 220/93; 8/14.1

[56] References Cited
UNITED STATES PATENTS

| | | | |
|---|---|---|---|
| 2,744,664 | 5/1956 | Paterson | 222/326 |
| 3,156,387 | 11/1964 | Harwood | 222/390 |
| 3,272,401 | 9/1966 | Fendler et al. | 222/386 X |
| 3,390,814 | 7/1968 | Creighton et al. | 222/145 X |
| 3,481,510 | 12/1969 | Allen, Jr. | 222/327 X |

*Primary Examiner*—Robert B. Reeves
*Assistant Examiner*—James M. Slattery

[57] ABSTRACT

Extrusion packages for viscous materials such as caulking compounds and lubricants are provided which may be used in conventional dispensers such as caulking guns and which are prepared for or are adaptable to extrusion by a screw-type mechanism. The packages may be used as well with improved and balanced guns described in another application and lend themselves to simple utilization of power hand tools to provide extrusion. The devices permit ready simultaneous extrusion of two materials and may contain mixing sections for such operation. They are also compatible with flow control methods.

6 Claims, 15 Drawing Figures

INVENTOR
FRANCIS H. BRATTON
BY Francis H. Bratton

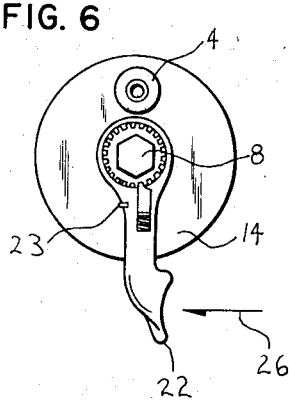
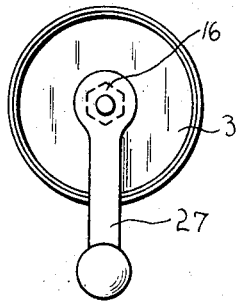
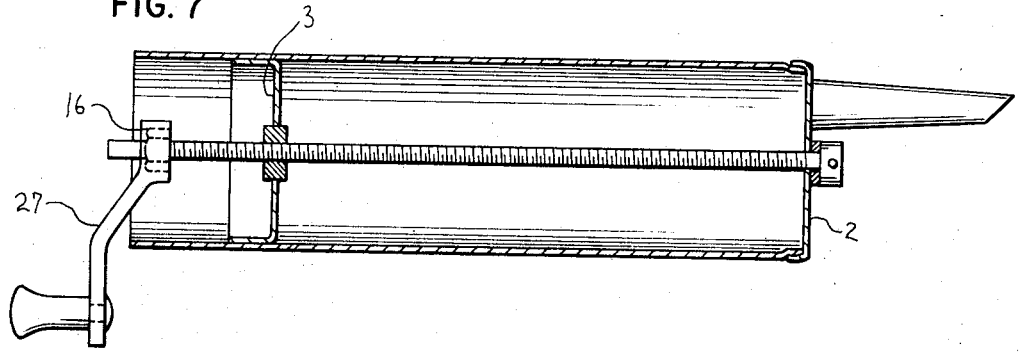
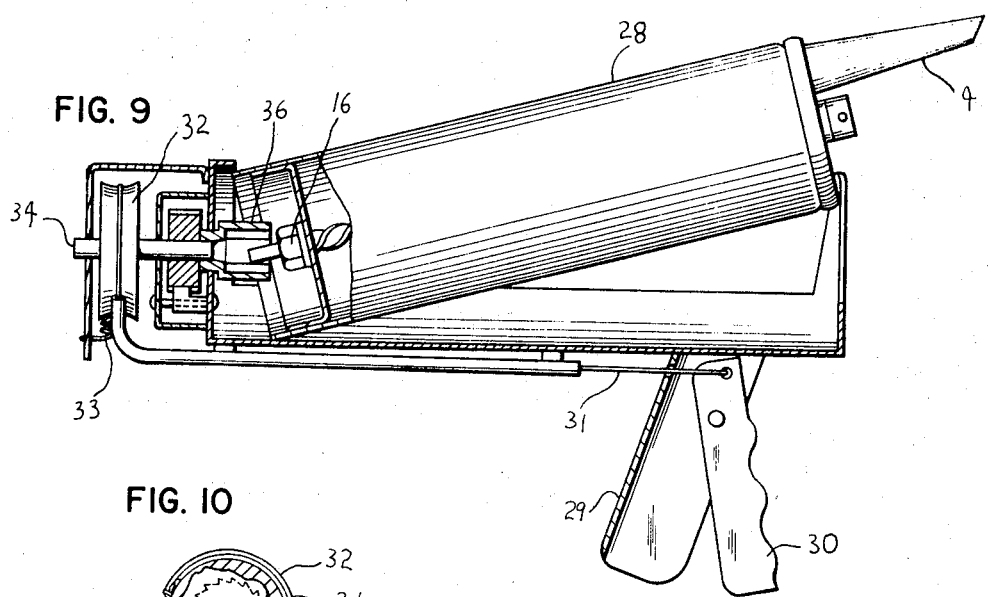
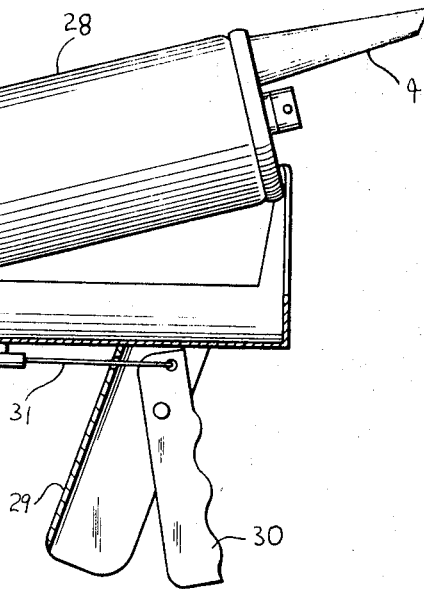
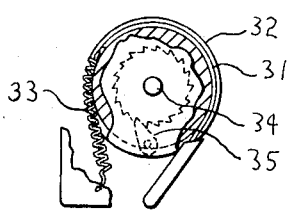
INVENTOR
FRANCIS H. BRATTON INVENTOR
FRANCIS H. BRATTON
BY Francis H. Bratton

EXTRUSION PACKAGES FOR VISCOUS MATERIALS

The subject matter contained in this application is related to that in my co-pending applications entitled: Containers For Extrudable Materials, Ser. No. 161,502 filed 7/12/71, Caulking Guns Of Improved Design, Ser. No. 161,496 filed 7/12/71 and Flow Control Valve And Pressure Indicator For Viscous Material Systems, Ser. No. 161,497 filed 7/12/71.

SUMMARY OF THE DISCLOSURE

Simple low cost packages for caulking compounds and similar materials are provided which may be used with conventional extrusion equipment or which may be used to extrude the materials from the packages by screw mechanisms. The screw mechanisms may be supplied with the packages or offered as a separate item of manufacture. Operability is realized through the use of materials and arrangements which will produce seals for the packages to prevent leakage, arrangements for insertion (or removal) of the optional screw extruding component, and shank attachments which allow ready application of simple power tools to aid extrusion.

BACKGROUND OF THE INVENTION

In the use of caulking and other viscous materials widespread use is made of disposable containers which are emptied with the aid of caulking guns. These devices generally apply pressure to a movable piston within the essentially rigid and round cartridge by hand jacking of a push rod. While some improvements are being proposed for these guns and similar devices in another application they may be used effectively with the packages of the present invention.

The present caulking guns in their various forms are quite effective devices but do present some problems, particularly when dealing with costly materials, when seeking precise smooth placement of the extruded material, and in not being suitable to use with simple power tools to speed up the operation and reduce difficult manual effort.

In the present packaging methods materials are often supplied in large cartridges (2 inch diameter × about 8 inch length) or in metal or plastic tubes. As the latter are expensive the change from one material to another has involved the need for a caulking gun and thus changes to different types and colors are not now easily accomplished. The new package concepts will allow ready use of a variety of small precision applicators when needed and will still allow the shift to the forthright deposition by caulking guns.

The new containers are compatible with optimum designs for sealing the openings of the packages, with non-drip piston design, multiple seal type pistons, etc. without departing from the scope of the invention.

There are a number of materials in use today as adhesives and sealants which must be mixed or catalyzed in the field. Since the components must be stored separately and then be mixed before use simple equipment to accomplish this is frequently needed. The present invention provides packages which will store components separately and then extrude them in a desired ratio and provide mixing at the same time.

The present package is provided to offer a contained system for packaging viscous material so that controlled or metered amounts may be released as needed. An essentially rigid tube with an internal screw mechanism is provided to give micrometer amounts of costly materials or to provide for easy smooth extrusion of softer, lower cost materials. The energy for driving the screw may be provided by manual effort or by a power operated device such as an electric or pneumatic drill motor. The system is also compatible with flow control methods as required.

The advantages of the system lie in the convenience of the package for use and reuse in a variety of discharge methods and the ease with which it may be sealed in between. As it is a rigid, sturdy system, dangers due to tearing or puncturing, loss of volatile materials and deleterious effects of materials such as oxygen and moisture are minimized. It is applicable for use with such materials as caulking sealants and adhesives, viscous grinding compounds and lubricating materials, paints, colors and colorants, food materials. It can be made into models which may be operated with one hand for use in cramped spaces.

It is an object of the present invention to provide packages which may be used for extrusion of viscous materials by simple screw methods and which are adapted for use in conventional caulking guns or other extruding equipment.

It is an object of the present invention to provide a packaging system for viscous materials which permits close control of extrusion rate and amount.

It is an object of the present invention to give improved shelf life in packages of viscous material.

It is an object of the present invention to provide packages for viscous material with reduced susceptability to physical and mechanical damage.

It is an object of the present invention to provide a dispensing system for the extrusion of viscous materials which can be operated with commonly available power tools.

It is an object of the present invention to provide for controlled rate of release of multi-component systems from a single package in a predetermined ratio.

It is an object of the present invention in the controlled release of multi-component systems to provide mixing for the materials as they are extruded.

It is an object of the present invention to provide for simple one hand operation of packaged viscous material and to provide an extrusion package which may be used in cramped positions.

It is an object of the present invention to provide means for packaging different types and colors or caulking material in fractional type packages of low cost.

BRIEF DESCRIPTION OF THE DRAWING

FIGS. 7 and 8 show a simple crank drive for a screw container.

FIGS. 9 and 10 show a balanced screw driven caulking gun and container.

DETAILED DESCRIPTION OF THE DRAWING

Figure 1:
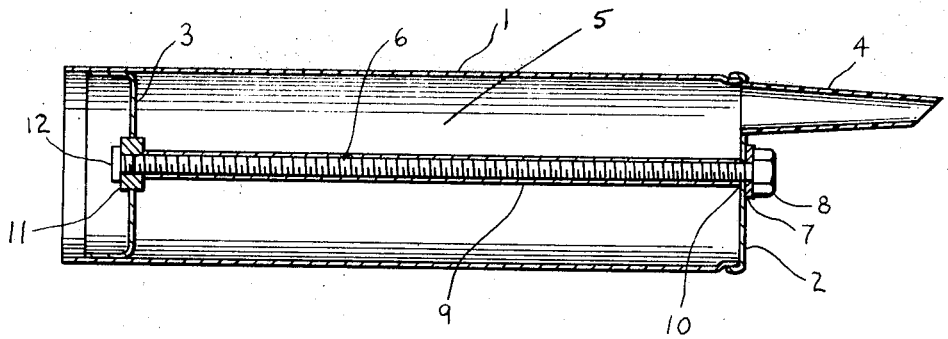
FIG. 1 illustrates a screw-operated dispensing unit which may be used with simple tools. Its use in a caulking gun is shown in FIG. 2.

A number of specific examples of ways in which the present invention may be practiced are described below and are presented to illustrate its embodiment but not to limit its application.

EXAMPLE I

This unit illustrates a cartridge which may be used for extrusion with simple tools or in a conventional caulking gun. It is comprised of an essentially cylindrical cartridge with relatively impermeable wall (1) to which is attached a rigid bulkhead (2) which contains a spout (4). A movable, close fitting, somewhat resilient piston (3) is shown confining the extrudable contents contained in the region (5).

Figure 2:
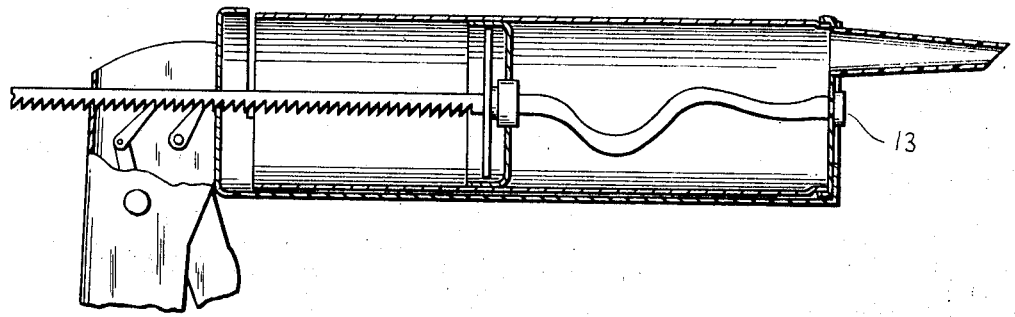
Figure 4:
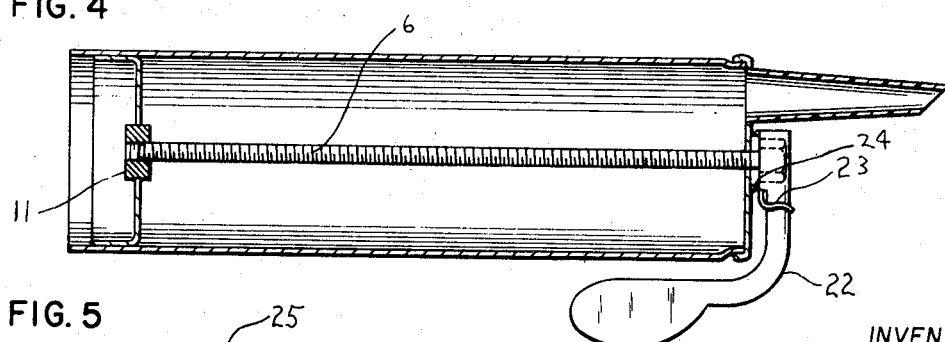
FIGS. 4 and 5 show a screw driven extrusion unit which is sealed by the use of a plastic coated rod, and its operation with a thumb lever is shown in FIG. 6.

In the filling of the cartridge the small screw (6) is provided with a shoulder bearing (7) and an integral or attached nut (8). The screw fits easily into a soft inert plastic tube (9) which in turn fits easily into a reinforced hole (10) in the rigid bulkhead. When the cartridge has been filled in vertical position, the screw (6) is engaged in the threads in a flat metal nut (11) which is attached to the movable piston (3). A soft plastic plug (12) is also inserted in the nut (11) and will seal the piston when the cartridge is used in a conventional gun as shown in FIG. 2, or will be forced out when the container is used by turning the nut (8). For the latter operation a special fitting or a simple ratchet wrench may be used, and one mode is illustrated in FIG. 4. When the screw thread is turned in the proper direction the piston (3) is pulled toward the bulkhead (2) and the extrudable contents is discharged through the spout (4) which is opened for this purpose. The plastic tube helps to provide a seal and is largely destroyed in this operation.

For use in a conventional caulking gun or some of those illustrated in my copending application, Caulking Guns Of Improved Design, the screw (6) is removed by turning the nut (8) to disengage the threaded portion from the nut (11) and then removing it through the hole (10). The collapsed tube (9) will seal the hole or an additional plug (13) may be inserted. The cartridge may then be inserted in a gun and is shown as it appears when partially exhausted in FIG. 2.

EXAMPLE II

Figure 3:
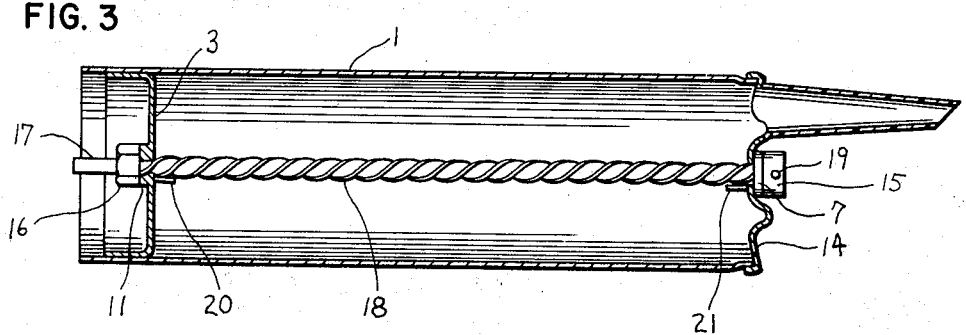
FIG. 3 shows a twisted rod driven dispensing unit with formed bulkhead.

The unit in FIG. 3 illustrates another similar means for arranging screw driven containers which may be used in a conventional caulking gun. The formed bulkhead (14) has been provided to allow economy in material and provision for applying force to the rear of the cartridge has been made by placing a thrust bearing (7) in the bulkhead. For simple tool operation a wrench or crank (See FIG. 6) may turn the nut (16), or a power unit such as an electric drill may turn the twisted rod (18) by the shank (17). Either rotation of the twisted rod moves the piston toward the bulkhead (14) in a jacking operation against the collar (15). A close fit to the nut (11) is provided and leakage is thereby small.

For operation in a conventional caulking gun the pull pin (19) is removed and the twisted rod is removed by gently unscrewing through the nut (11). On removal of the rod the flaps (20) and (21) cover and seal the holes.

EXAMPLE III

Figure 5:
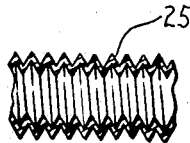

The operation of a screw driven unit is illustrated in FIG. 4 in which a ratchet wrench (22) with a bent or turned handle has been positioned over a drive nut. While it is operable without a return position spring (23), one has been shown engaged by a stop (24) on the bulkhead. In this unit the drive screw (6) has been coated with a soft plastic (25) of moderate strength which provides a seal prior to being scraped off by the nut (11). The plastic (25) is shown in the enlarged view in FIG. 5. An end view is shown in FIG. 6. The direction of force (26) on the thumb lever (22) is indicated. The spring (23) returns the lever after the nut (8) is moved by the wrench.

EXAMPLE IV

The cartridge unit in FIGS. 7 and 8 has been adapted for simple tool operation by placing a crank driven wrench (27) on the drive nut (16). (See FIG. 3). This unit may be held in one hand and cranked with the other, an operation which is attractive with high thread per inch count. Extrusion pressure is developed between the front rigid barrier (2) and the piston (3).

EXAMPLE V

The caulking gun in FIGS. 9 and 10 is designed to hold a container in a good position for directing bead location. The cartridge (28), similar to the one in FIG. 3, is inserted with the spout (4) in discharge position and a clamp (not shown) may be fastened to retain it. When held by the handle (29) the movement of the drive lever (30) by the tensile action on the filament (31) causes rotation of pulley (32) against the action of the return spring (33). This causes rotation of shaft (34) in the desired direction and the ratchet mechanism (35) prevents slippage. This in turn drives the socket (36) which engages the nut (16).

EXAMPLE VI

Figure 11:
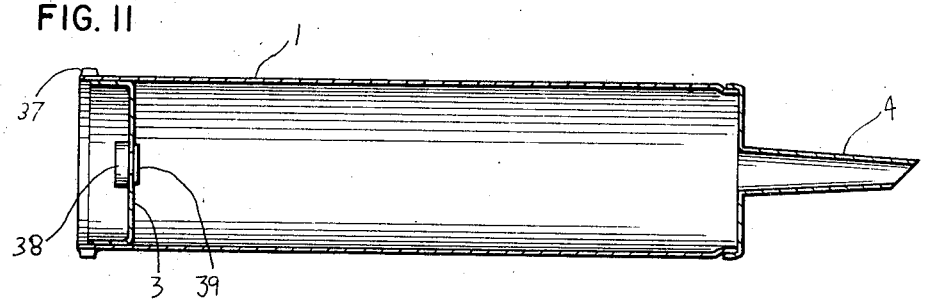
FIG. 11 shows a cartridge designed for screw insertion or for caulking gun operation.

The container in FIG. 11 is shown as a loaded caulking cartridge ready for use in a conventional or special gun. The wall (1) is of good tensile strength and is provided with a tension flange (37) to allow attachment of a thrust plate. The movable piston (3) is provided with a nut (38) designed to accept a threaded rod or twisted bardrive unit. A frangible seal (39) is provided behind the nut to allow a forced insertion of a screw drive rod if desired. In the absence of the drive rod this serves as an effective seal in a conventional push gun.

EXAMPLE VII

Figure 12:
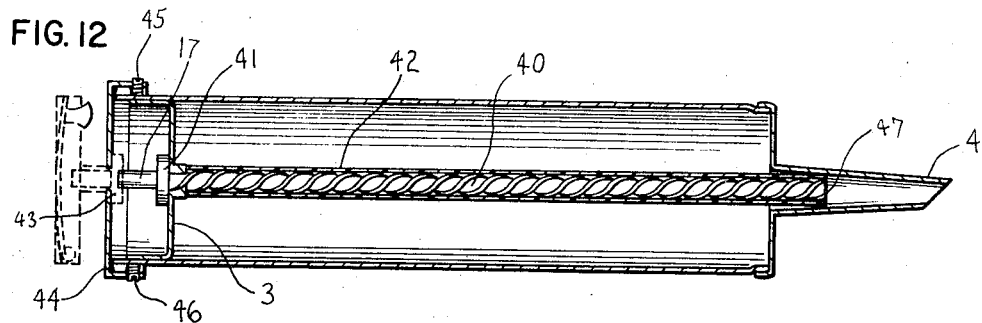
FIG. 12 shows a cartridge for extrusion with a screw which may be removed.

The unit shown in FIG. 12 is arranged for screw operation and is of the type of the previous example. In this case a threaded drive unit (40) with thrust collar (41) is provided in the cartridge in a thin plastic sleeve (42). The threaded rod may be removed for gun operation. For screw operation the collar (41) and rod (40) are moved to the rear to the location shown in dotted lines (43) to engage a rear thrust plate (44) which is fastened in place as with set screws (45) and (46). On turning the drive screw in proper direction with a power shank (17), a knob, or other device, the piston (3) is moved toward the spout to produce extrusion. In operation the sealed end (47) of the plastic tube collapses by extrusion pressure and allows material flow through the spout (4).

EXAMPLE VIII

Figure 13:
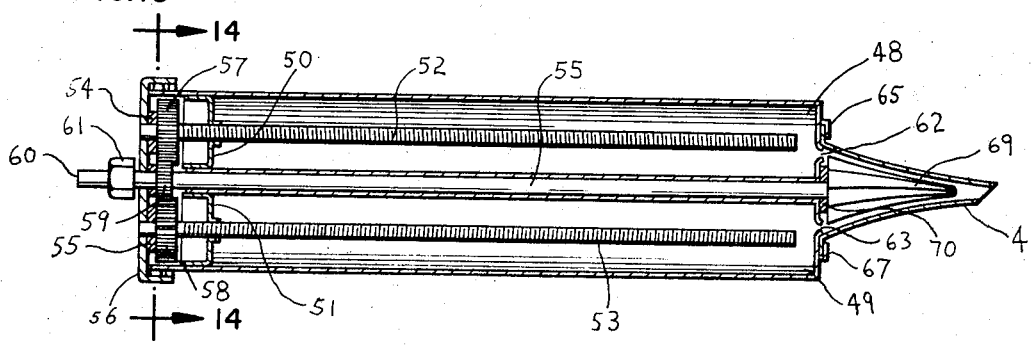
FIGS. 13, 14, and 15 show one means by which dual extrusion and mixing can be accomplished.
Figure 14:
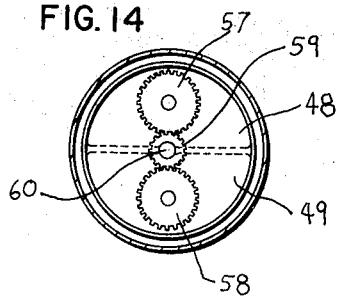
Figure 15:
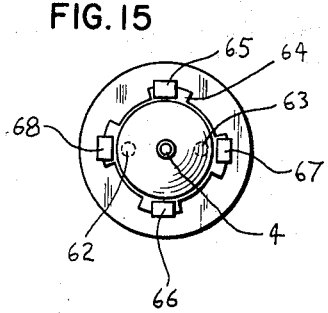

A dual mixing extruder designed for simple power or hand drive is shown in FIGS. 13, 14, and 15. Two mated fractional portions of a cylindrical container are suitably fastened together, and in this case half cylinders (48) and (49) may contain materials designed to be mixed together for use. The movable pistons (50) and (51) are designed to fit the fractional cylinders snugly to cause extrusion. The force for extrusion is produced by rotation of the screw drives (52) and (53) which have opposite thread rotation directions, and which each have thrust bearings (54) and (55) against the thrust cover (56). The gears which turn the threaded rods (57) and (58) are engaged with the center gear (59) which is attached to the central shaft (60), which has a power shank and nut (61). For operation the holes (62) and (63) are opened by removing plugs and the conical mixing spout is attached by rotating its toothed edge (64), shown in FIG. 15, under the holding clips (65), (66), (67), and (68), and is designed to fit fairly smugly to the mixing cone (69). The cone may be made of easily cleaned plastic or metal and rotates with the central shaft. It is provided with a seal and bearing unit (70) of non-binding materials. Rotation of the drive shaft advances the two pistons at equal rates and the materials extruded from the partial cylinders in a predetermined ratio are mixed in the conical mixing section.

The arrangement of this example may be used for a two component extruder unit in a conventional caulking gun by making it about one half the length of the usual cartridge and putting a split push rod in to drive the pistons. This would be done after the removal of the drive screws after the procedure of the examples above. For this type operation the discharge holes may be located close to one another and the mixing section may be eliminated.

In the examples used above to illustrate the present invention it will be recognized that the methods and materials of construction may be selected for their economy, utility and effectiveness.

I claim:

1. A substantially round container for extrudable viscous material comprising: a rigid container body having at least one fully open end and a supply space therein substantially filled with viscous material, said container body having an end wall closing off the other end thereof, said end wall including a spout for dispensing said material, a dispensing unit connected to the open end of the container comprising a rotatable screw member having a threaded portion which extends longitudinally within said container body for substantially most of the length thereof, a piston slidably mounted for longitudinal movement within said container body and an opening threaded over said threaded portion of said screw member, ratchet means releasably attachable to the screw member and rotatable to transfer rotation to the screw member and longitudinal movement to the piston thus dispensing the material through the spout, said screw member releasably secured to said piston opening and to an opening in the end wall, resiliently biased sealing flaps secured adjacent the piston opening and the opening in the end wall, upon removal of the screw member the sealing flaps close the openings, whereby the material within the container may be dispensed in a conventional caulking gun.

2. A substantially round container for extrudable viscous material comprising: a rigid container body having at least one fully open end, said open end provided with a tension flange, and a supply space therein substantially filled with viscous material, said container body having said open end provided with a tension flange and said container body also having an end wall closing off the other end thereof, said end wall including a spout for dispensing said material, a dispensing unit attachable to the open end of the container comprising a rotatable screw member having a threaded portion which can extend longitudinally within said container for substantially most of the length thereof, a thrust cap with a central thrust bearing to which said rotatable screw member is affixed, which cap may be firmly attached to said tension flange of the open end wall, a piston slidably mounted for longitudinal movement within said container body, said piston having a central threaded opening to fit over said threaded portion of said screw member, said threaded opening being provided with a frangible seal rupturable by insertion of said rotatable screw member, ratchet means releasably attached to said screw member and rotatable to transfer rotation to the screw member and longitudinal movement to the piston to thus dispense the extrudable material through the spout, and whereby the material in said container may be dispensed in a conventional caulking gun without the attachment of said dispensing unit.

3. A substantially round container for extrudable viscous material comprising: a rigid container body having at least one fully open end and a supply space therein substantially filled with viscous material, said container having an end wall closing off the other end thereof, said end wall including a spout for dispensing said material, a dispensing unit connected to the open end of the container comprising a rotatable screw member having a threaded portion which extends longitudinally within said container body for substantially all the length thereof, a piston slidably mounted for longitudinal movement within said container body and an opening threaded to fit over said threaded portion of said screw member, ratchet means releasably attached to the screw member and rotatably to transfer rotation to the screw member and longitudinal movement to the piston thus dispensing the material through the spout, said screw member releasably secured to said piston opening and to an opening in the end wall, resilient plastic tubing secured to the piston opening and to the opening in the end wall, and covering said threaded member whereupon removal of the screw member the tubing continues to seal the openings whereby the material within the container may be dispensed in a conventional caulking gun.

4. A substantially round longitudinally compartmented container for extrudable viscous materials comprising two partially cylindrical container bodies each having at least one fully open end and a supply space therein substantially filled with viscous material, each container having an end wall closing off the other end thereof, said end wall including an orifice for dispensing each of said materials, and said open end walls provided with a tension flange, a dispensing unit connected to the open end of the containers comprising two rotatable screw members having threaded portions which extend longitudinally within said container bodies for substantially all the length thereof, two partially round pistons slidably mounted for longitudinal movement within said container bodies and openings threaded over said threaded portions of said screw members, a thrust cap with thrust bearings to which said rotatable screw members are affixed, wherein said cap has attached a central shaft with a geared wheel to engage other geared wheels attached to said screw members to rotate said screw members and which said cap is firmly attached to said tension flange of the open end wall, ratchet means attached to the central shaft and rotatable to transfer rotation to the screw members and longitudinal movement of the pistons to thus dispense the extrudable materials through the orifices.

5. The device in claim 4 wherein the screw members are releasably attached and the two pistons may be engaged in a conventional type caulking gun with a split pressure drive.

6. The device in claim 4 wherein the central shaft extends through the center of the container in an axial tubular structure and to which central shaft is attached a device for mixing materials extruded by the two pistons.

* * * * *